United States Patent [19]
Buxe

[11] Patent Number: 4,817,455
[45] Date of Patent: Apr. 4, 1989

[54] GAS TURBINE ENGINE BALANCING

[75] Inventor: Paul M. Buxe, Lake Park, Fla.

[73] Assignee: United Technologies Corporation, Hartford, Conn.

[21] Appl. No.: 108,612

[22] Filed: Oct. 15, 1987

[51] Int. Cl.[4] .................... F16F 15/22; F16F 15/10; G05G 1/00

[52] U.S. Cl. .................. 74/573 R; 415/119; 416/144; 416/500; 74/572; 74/574

[58] Field of Search ............. 74/573 R, 572, 574; 415/119 X, 500, 219 C, 219 R, 219 B, 219 A; 416/144 X, 500 X

[56] References Cited

U.S. PATENT DOCUMENTS

| | | | |
|---|---|---|---|
| 3,273,419 | 9/1966 | Kollmann et al. | 74/573 |
| 3,730,013 | 5/1973 | Slemmons | 74/573 R X |
| 3,916,495 | 11/1975 | Klassen et al. | 74/573 R X |
| 3,964,342 | 6/1976 | Beam et al. | 74/573 R |
| 4,192,633 | 3/1980 | Herzner | 415/119 |
| 4,220,055 | 9/1980 | Dubois et al. | 74/573 R |
| 4,294,135 | 10/1981 | Tameo | 74/573 R |
| 4,300,803 | 11/1981 | Chorosevic | 74/573 R X |
| 4,728,255 | 3/1988 | Kirkpatrick et al. | 15/119 |

FOREIGN PATENT DOCUMENTS

| | | | |
|---|---|---|---|
| 621061 | 5/1961 | Canada | 74/573 R |
| 1473687 | 1/1969 | Fed. Rep. of Germany | 74/573 R |
| 0153956 | 11/1981 | Japan | 74/573 R |
| 0624130 | 8/1978 | U.S.S.R. | 74/573 R |
| 805371 | 12/1958 | United Kingdom | 74/573 R |

Primary Examiner—Richard E. Moore
Assistant Examiner—Vinh Luong
Attorney, Agent, or Firm—Edward L. Kochey, Jr.

[57] ABSTRACT

A snap ring substantially uniform corss section is placed within a groove in a rotor disk of a bladed rotor. Unbalance of the bladed rotor with the ring installed is determined. The snap ring is removed for grinding to correct the unbalance and reinstalled at the same location grinding on or near the rotor is thereby avoided.

2 Claims, 2 Drawing Sheets

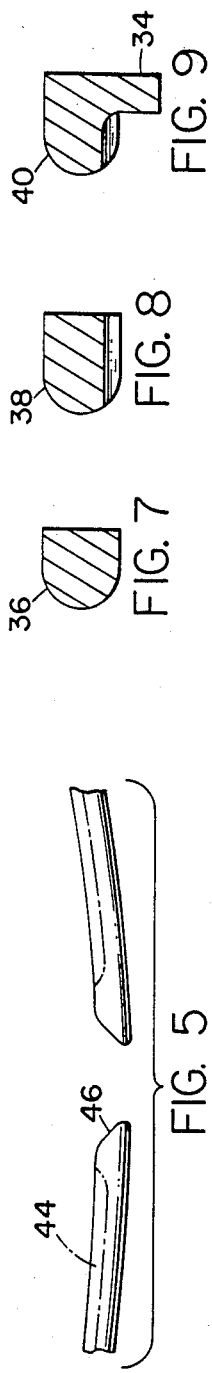

GAS TURBINE ENGINE BALANCING

The Government has rights in this invention pursuant to a contract awarded by the Department of the Air Force.

DESCRIPTION

1. Technical Field

The invention relates to gas turbine bladed rotors and in particular to a method apparatus for balancing the rotors.

2. Background of the Invention

Gas turbine engine rotors require balancing to avoid destructive vibration in operation. Balancing is achieved by rotating the assembly and determining the amount and location of unbalance. Material is then added or removed to correct the unbalance.

Grinding on the disk is permissible only for certain low temperature systems which use material tolerant of grinding without further heat treatment and in rare low stress situations. Installation of a permanent separate ring on the disk has been suggested with grinding carried out only on the ring. Grinding on a ring which is in place on the disk creates a potential for nicking and thereby destroying the disk with one careless movement of the grinder. Attempts to place the ring remote from the bulk of the disk leads to bending stresses in the arms supporting the ring. Even with such attempts the ring remains relatively close to the disk.

Even when balanced, blade vibration occurs which can be destructive when approaching the natural frequency of the components. These vibrations need to be damped out to reduce stress levels to acceptable levels.

SUMMARY OF THE INVENTION

A bladed rotor has a cylindrical extension which in turn has a circumferential ring receiving groove around its inner periphery. A split balance ring of substantially uniform cross sectional area is placed within the groove at a single preselected position. This assembly is spun to determine the balance correction needs. The ring is then removed to a remote location and ground without danger to the disk, after which it is reinstalled at the identical preselected position. Frictional damping between the snap ring and the disk will dampen the blade vibrations.

BRIEF DESCRIPTION OF THE DRAWINGS

FIG. 5 is a view of the split end of the balance ring;

FIG. 6 is a detail of the ring in the area of the interlocking protrusions;

FIG. 7 is a view of section 7—7 through FIG. 6;

FIG. 8 is a view of section 8—8 through FIG. 6; and

FIG. 9 is a view of section 9—9 through FIG. 6.

DESCRIPTION OF THE PREFERRED EMBODIMENT

Figure 3:
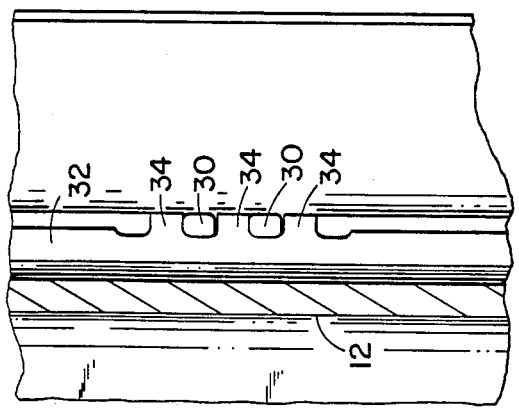
FIG. 3 is a view through section 3—3 of FIG. 2.
Figure 2:
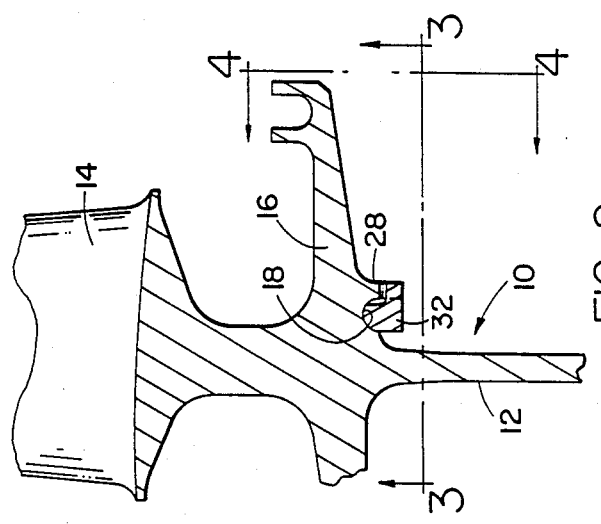
FIG. 2 is an expanded section of the balance ring area.

The bladed rotor 10 is comprises of a turbine disk 12 carrying a plurality of blades 14. A circumferential axially extending cylindrical extension 16 contains around its inner periphery an inwardly facing groove 18. This groove is rounded in cross section thereby avoiding stress concentrations.

The groove has a uniform shoulder 28 around the majority of its circumference with locking protrusions 30 at one location only.

A resilient split outwardly biased balancing ring has an initial substantially uniform cross section and includes interlocking protrusions 30 at one location only around its circumference. These interlocking protrusions 34 are formed to engage the locking protrusions 30 so that the ring may be placed in a single preselected position.

There is no intent to correct unbalance by the initial insertion of the ring and as seen in FIGS. 7-9 the cross-sectional area 36, 38 and 40 is modified in the area of the interlocking protrusion 34 to continue the substantially uniform weight per unit length of the balance ring.

Figure 4:
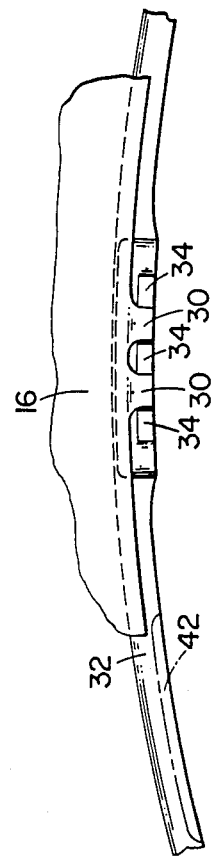
FIG. 4 is an end view 4—4 of FIG. 2.
Figure 1:
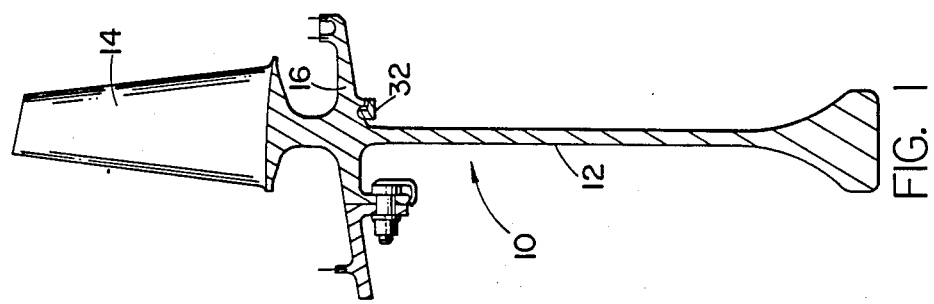
FIG. 1 is a sectional view through one half the rotor showing the balance ring location.

After an initial unbalance determination is made the ring 32 is removed from the disk and carried to a remote location. At this point material is ground from the ring as indicated by ground removal area 42 in FIG. 4 or ground removal area 44 adjacent to the split 46 of the ring as shown in FIG. 5. Such grinding is carried out, of course, with absolutely no danger of damage to the disk. After the material has been removed from the balance ring, the ring is reinserted in the identical position using the interlocking protrusions and the protrusions to reestablish the initial position.

The snap ring will dampen vibrations of the rotor and airfoil vibrations from natural frequency drivers because of the friction damping of the snap ring in the disk slot. This damper is located at the rim of the disk which should damp rim and airfoil vibrations.

By using a replaceable snap ring for balance, a new ring with full balance capability can be used after the disk has been repaired during its lifetime. Otherwise, as airfoils are blended to remove operational damage and the rotor goes out of balance it may be found that the original balance capability is used up, and that the repaired disk cannot be balanced.

I claim:

1. A bladed rotor balance arrangement comprising:
   a bladed rotor having a circumferential axially extending cylindrical extension;
   an inwardly facing groove in said cylindrical extension having a rounded ring receiving surface at the root thereof around the inner periphery of said extension;
   a locking protrusion located on said extension adjacent to said groove at one location only;
   a resilient split balancing ring of initial substantially uniform cross section, formed to mate with said rounded ring receiving surface, and having an interlocking protrusion at one location only, said locking protrusion and said interlocking protrusion formed to interlock with each other; and
   said resilient split balancing ring removably located in said groove with said locking protrusion and said interlocking protrusion engaged, whereby said ring may be removed for balance grinding and replaced in the identical position.

2. The arrangement of claim 1:
   said ring having a reduced thickness in the area of interlocking protrusion in an amount to compensate for the additional weight of said interlocking protrusion.

* * * * *